Dec. 26, 1950 M. F. ARMELIN 2,535,774
MECHANISM FOR CONVERTING A UNIFORM
MOTION INTO A VARIABLE MOTION
Filed June 21, 1949 3 Sheets-Sheet 1

Inventor
Maurice François Armelin
By Robert E. Burns
Attorney

Dec. 26, 1950 M. F. ARMELIN 2,535,774
MECHANISM FOR CONVERTING A UNIFORM
MOTIOM INTO A VARIABLE MOTION
Filed June 21, 1949 3 Sheets-Sheet 2

Inventor:
Maurice François Armelin
By Robert E. Burns
Attorney

Patented Dec. 26, 1950

2,535,774

UNITED STATES PATENT OFFICE 2,535,774

MECHANISM FOR CONVERTING A UNIFORM MOTION INTO A VARIABLE MOTION

Maurice François Armelin, Paris, France, assignor to Societe d'Etudes de Machines Speciales, Paris, France Application June 21, 1949, Serial No. 100,402
In France April 15, 1949

2 Claims. (Cl. 74—394)

1

The present invention has for its object a transmission mechanism intended to convert a uniform rotational motion into a rotational motion which is variable in accordance with an algebraic law, which law may either be predetermined to suit definite operating conditions or be modifiable as desired in operation and may involve either unidirectional or reciprocatory motions as well as periodic stops.

The said mechanism intended to convert a uniform rotational motion into an algebraically variable rotational motion comprises a frame, a driving member rotatably mounted in said frame, a driven pinion mounted coaxially of said driving member for rotational motion relative thereto, a spindle mounted on said driving member and parallel with the axis of said driving member, a planetary pinion mounted on said spindle and meshing with said driven pinion, an elongated slide rigid with said planetary pinion, pin carrying means movably mounted on the frame, a pin secured on said means slidably and rotatably received in said slide and adapted to guide the same, actuating means for said pin carrying means with regard to the frame.

A preferred embodiment of the invention will be described hereinafter for the purpose of exemplification and by no means of limitation, reference being had to the appended drawings in which—

Figure 1:
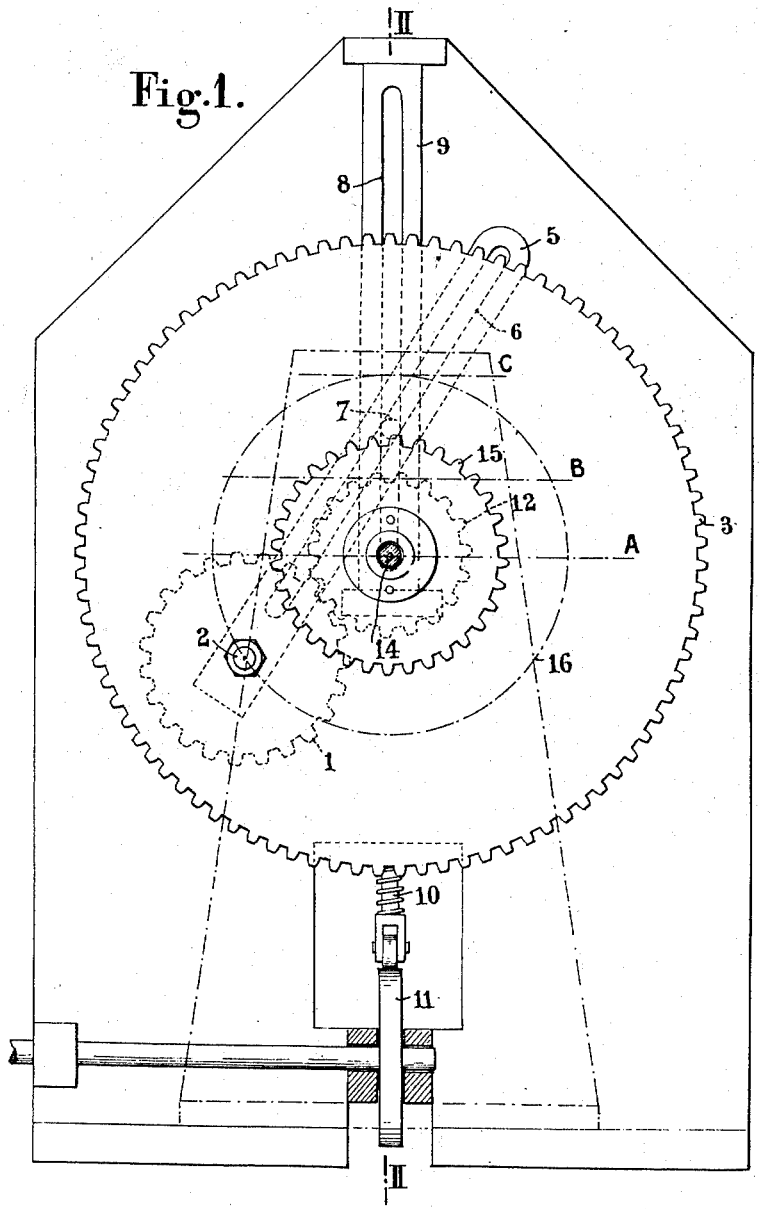
Fig. 1 is a diagrammatic elevational section of the mechanism on line I—I in Fig. 2.
Figure 2:
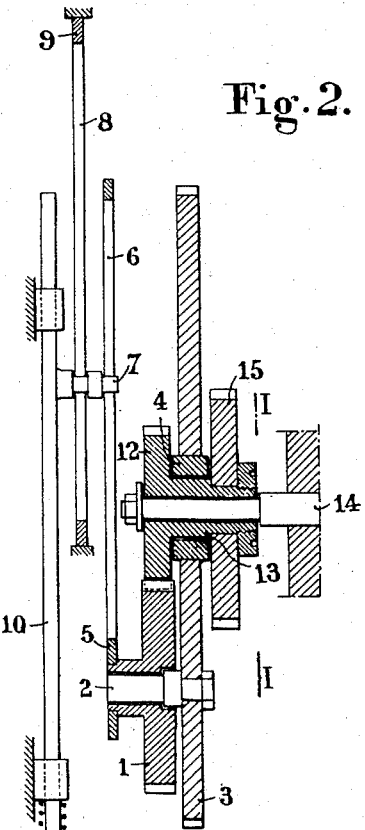
Figure 2 is a sectional view taken on line II—II in Fig. 1, the planetary pinion being assumed to occupy the lowermost point in its revolution and the slide rigid therewith being directed vertically upwards.

A pinion 1 is mounted idle on a spindle 2 rigid with a toothed disc 3 keyed on a central bushing member 4. Rigid with the pinion 1 is a slide 5 provided lengthwise thereof with a central guide slot 6. The axis of slot 6 intersects the axis of spindle 2 at right angles thereto. A pin 7 having its axis parallel with those of spindle 2 and shaft 4 and guided in a straight slot 8 milled in a guide 9 rigid with the frame is secured rigidly to a sliding rod 10 acted upon by a cam 11. The reciprocatory motion of the sliding rod may be derived from the driving motion itself or from the motion of parts driven by the mechanism. Moreover, the pin 7 projects through the guide slot 6 in slide 5, the diameter of the pin 7 being equal, due account being taken of

2 the necessary play, to the width of either slot 6 or 8. Since the slide 5 partakes of the revolution of the pinion 1 about spindle 2 it becomes thus capable both of sliding on and of revolving about the pin 7. The slot 6 may have any desired length provided the said length is sufficient to enable the slide 5 to freely move on pin 7 the extent of the maximum distance that may separate the axis of the spindle 2 from that of pin 7 in operation; at all events the said distance must be larger than the crank arm length determined by the distance from the axis of spindle 2 to the axis of shaft 4. A central pinion 12 meshing with the planetary pinion 1 is formed with a hub extension 13 nested in the central bushing member 4 and rotatably mounted on a main bolt 14 coaxial with hub extension 13 and bushing member 4; keyed on that portion of the hub extension which projects beyond the toothed disc 3 is a pinion 15.

The pitch circles of the central pinion 12 and of the planetary pinion 1 may or not be equal in diameter.

Normally, the mechanism is driven through the toothed disc 3 and in its turn drives further rotatable members through the medium of pinion 15. However, in certain sections of the path of pin 7 it may operate conversely and be driven through pinion 15.

The following is a description of the normal operation of the mechanism corresponding to various fixed positions of pin 7. By varying the said positions in operation it becomes possible to correspondingly vary the motion obtained.

With the pin 7 secured in guide 9 anywhere between levels A and C the toothed disc 3 is driven in uniform rotational motion from the outside. Said disc moreover performs the function of a carrier for spindle 2 which consequently will be revolved in uniform motion about the central bushing member 4. If the planetary pinion 1 were made rigid with the disc 3 a uniform rotational motion would be imparted to the central pinion 12 since always the same teeth would remain meshed with one another. However, owing to the action of the slide 5, a motion is imparted to said pinion 2 relative to the toothed disc 3 inasmuch as said pinion is rocked or angularly displaced now in the one and now in the other directions; of course, this will only occur where the pin 7 is positioned below level C. Pinions 1 and 12 will remain meshed with each other over limited sections of their peripheries except where the latter is much smaller than the former. Anyhow, an absolute motion is imparted to pinion 12 which is the resultant derived from:

1. The uniform circular motion of toothed disc 3;
2. The alternating circular motion resulting from the alternating rocking motion of pinion 1 relative to disc 3 through the medium of gears.

The amplitude and speed of the said alternating rocking motion increase as the pin 7 is moved away from level A towards level C. When the pin is exactly coaxial with bolt 14 no alternating rocking motion will occur, which means that the motion of pinion 12 will be uniform.

Figure 3:
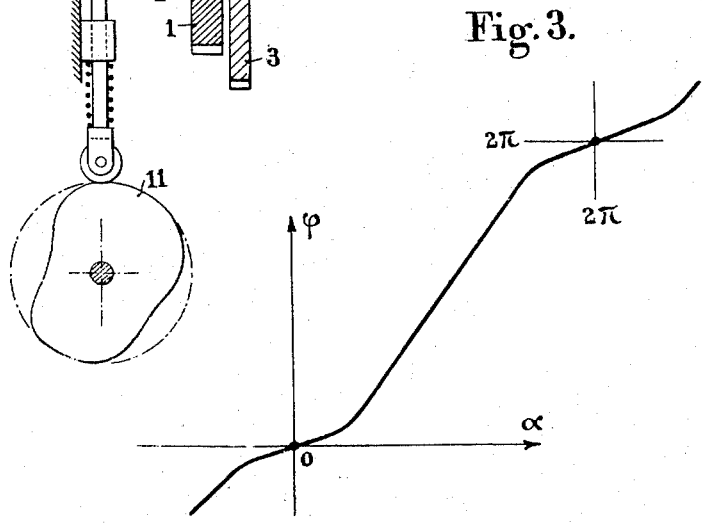
Figures 3, 4, 5 and 6 are diagrams of the motion of the sun gear corresponding to various fixed positions of the pin on the frame.

With the pin positioned between levels A and B the law of rotation of pinion 12 in dependency on the rotation of the toothed disc 3 is of the same kind as the one illustrated in Fig. 3.

Figure 4:
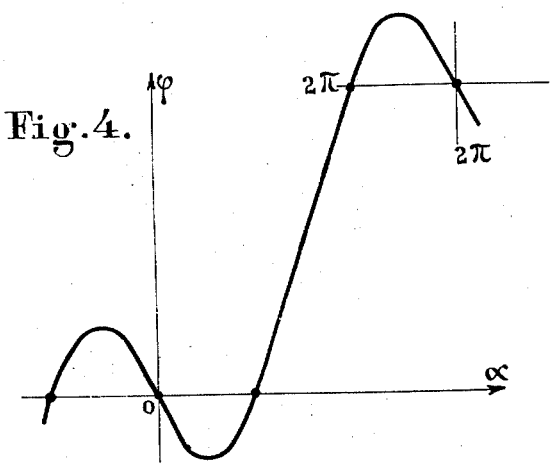

With the pin positioned between levels B and C the law of rotation of pinion 12 in dependency on the rotation of the toothed disc 3 is of the same kind as the one shown in Fig. 4; in this case the alternating rocking motion of pinion 1 relative to disc 3 is sufficiently ample and rapid to cause the pinion 12 at times to rotate in the reverse direction.

Figure 5:
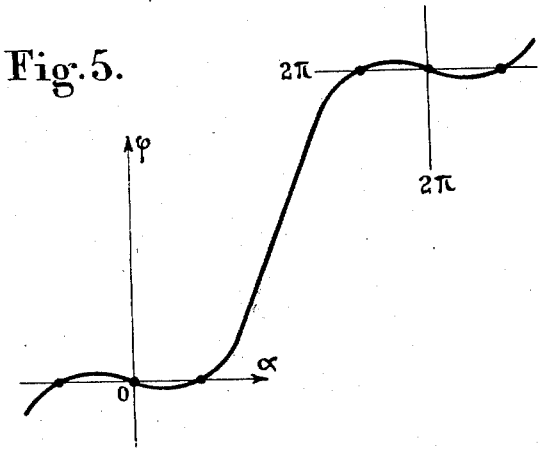
Figure 6:
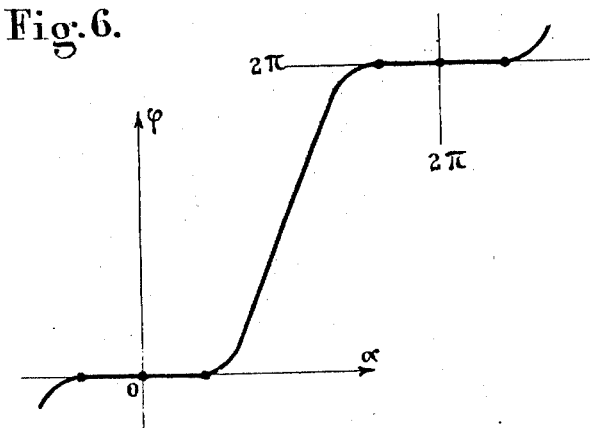

With the pin 7 positioned exactly at level B that corresponds to the topmost point of the pitch circle of pinion 12 the diagram will be slightly deflected horizontally, which means that the motion, if not reversed, at least is stopped for a little while. Practically, such a "level" will be obtained by setting the pin 7 just a little above level B, with the result that theoretically a diagram as shown in Fig. 5 would be obtained, i. e. would correspond to a slight retrograde motion, while actually, due to clearance effects, said diagram will resemble the one shown in Fig. 6 that evinces an appreciable period of rest. Contingently, with a view to lengthen such a "level," the clearances in the gearing may be designedly increased.

Most frequently, in the cases discussed hereinbefore, the gears will only come into action over part of their circumferences, so that toothed sectors may be substituted therefor. Also complete pinions may be used that can be reset in a different position on their respective shafts so that they will engage one another over undamaged portions of their peripheries. Each complete revolution of the toothed disc 3 corresponds to one complete revolution of pinions 12 and 15 rigid with each other.

With the pin 7 positioned at level C the mechanism is wedged.

With the pin 7 above level C the diagram of motion assumes a different shape: the movement is varied but its direction remains the same; the number of revolutions performed by pinions 12 and 15 is $$1 + \frac{R'}{R}$$

or $$1 + \frac{n'}{n}$$

in which formulae R and R' designate the radiuses of the pitch circles of pinions 12 and 1, while $n$ and $n'$ designate the respective numbers of teeth. In that case pinions 1 and 12 are always meshed at all points of their peripheries and can never be replaced by toothed sectors or quadrants.

In any position of pin 7 the law of movement is given by the formula:

$$\varphi = \alpha + \frac{R'}{R}\left[\alpha - \arctan\frac{\sin\alpha}{\cos\alpha - \frac{d}{R+R'}}\right]$$

in which:

$\varphi$ designates the angle of rotation of disc 3,
$\alpha$ designates the angle of rotation of pinion 12,
$d$ designates the distance from the axis of the wrist to the axis of disc 3,
R designates the radius of the pitch circle of pinion 12,
R' designates the radius of the pitch circle of pinion 1, the ascending vertical being taken as the origin of the angles.

Moving the pin 7 along the guide 8 will correlatively vary the law of movement; said law is expressed mathematically by the same formula as given above in which however $d$ is no longer a constant but a function of $\alpha$ or of time or any other desirable variable; it will be appreciated that very many different laws of motion can be obtained by moving the pin 7 in operation with the aid of an adequate mechanism in accordance with any desired law. For that purpose it will only be necessary to suitably design the cam 11 and to impart a suitable rotational motion to the same.

On the other hand, the curve described by the various points of the slide 5 in definite positions of the pin 7 possesses remarkable properties owing to which the motion of said slide 5 becomes available directly. For instance, with pinions 1 and 12 equal, B taken as the radius of their pitch circles and pin 7 positioned at level B, those points of slide 5 that are located at a distance of 5B or so from the axis of spindle 2 will move in the topmost portion of their paths along curves which very closely approximate straight line sections over quite an appreciable portion of their lengths.

The pin may be moved along a straight line, or a circle, or any desired curve by an adequate mechanism.

Amongst other advantages the mechanism described hereinbefore affords the following ones:

1. It makes it possible to obtain largely variable instantaneous speeds which the user can modify at will even in operation.
2. Very few variable-speed mechanisms have ever been devised in which a wide angle of rotation is available. For instance, with the aid of the mechanism known by the name of "Six-leg Geneva movement," a movement is obtained which is variable over one-sixth of a revolution, which makes it necessary in many cases to multiply the motions, which results in excessive pressures being exerted upon the follower. The mechanism according to this invention does not suffer from this inconvenience.
3. The mechanism described, which is very simple in design, may be used quite advantageously instead of certain devices which are very costly, such as elliptic gear trains. Over the latter it possesses this advantage that it is adjustable in operation and that its action is less abrupt.
4. It also makes it possible to obtain negative speeds, so that it may successfully be included in mechanisms designed to control the operation of certain handling equipment in which retrograde movement is required at a definite time, e. g. to release the materials.

5. Owing to the peculiar character of the motion of the slide said motion may usefully be resorted to in certain handling mechanisms, notably for the operation of suckers. Generally speaking, all such points of slide 5 as will move along paths that very closely approximate a straight line section may be availed of for controlling the actuation of parts that are wanted to move along at least approximately rectilinear paths.

What I claim is:

1. A mechanism for converting a uniform rotational motion into an algebraically variable rotational motion comprising a frame, a driving member rotatably mounted in said frame, a driven pinion mounted coaxially of said driving member for rotational motion relative thereto, a spindle mounted on said driving member and parallel with the axis of said driving member, a planetary pinion mounted on said spindle and meshing with said driven pinion, an elongated slide rigid with said planetary pinion, pin carrying means movably mounted on the frame, a pin secured on said means slidably and rotatably received in said slide and adapted to guide the same, actuating means for said pin carrying means with regard to the frame.

2. A mechanism according to claim 1 in which the actuating means for the pin carrying means comprise a cam and a follower.

MAURICE FRANÇOIS ARMELIN.

REFERENCES CITED

The following references are of record in the file of this patent:

UNITED STATES PATENTS

| Number | Name | Date |
| --- | --- | --- |
| 2,309,595 | James | Jan. 26, 1943 |